United States Patent [19]

Callies

[11] Patent Number: 5,230,198

[45] Date of Patent: Jul. 27, 1993

[54] VARIABLE PITCH CONNECTOR

[75] Inventor: Gerald Callies, New Prague, Minn.

[73] Assignee: United Steel Products Co., Montgomery, Minn.

[21] Appl. No.: 968,437

[22] Filed: Oct. 29, 1992

[51] Int. Cl.⁵ .................................................. E04B 1/38
[52] U.S. Cl. ..................................... 52/702; 52/712; 52/696; 52/92.2; 403/232.1; 403/403
[58] Field of Search ............ 52/702, 640, 696, 90-93, 52/712, 713; 403/232.1, 403

[56] References Cited

U.S. PATENT DOCUMENTS

| | | | |
|---|---|---|---|
| 2,354,801 | 8/1944 | DeHuff | 408/188 X |
| 3,184,800 | 5/1965 | Nelson | 52/90 X |
| 4,410,294 | 10/1983 | Gilb | 52/90 X |
| 4,572,695 | 2/1986 | Gilb | 52/702 X |
| 4,932,173 | 6/1990 | Commins | 52/702 X |

Primary Examiner—Carl D. Friedman
Assistant Examiner—Beth A. Aubrey
Attorney, Agent, or Firm—Dorsey & Whitney

[57] ABSTRACT

A variable pitch connector for supporting an inclined roof rafter. The connector includes a base, cradle, and support means. The support is a separate component, allowing the connector to be manufactured from differing weights of steel. The variable pitch connector may be retrofitted to existing roof assemblies. The invention also relates to a method for installing such connector.

21 Claims, 2 Drawing Sheets

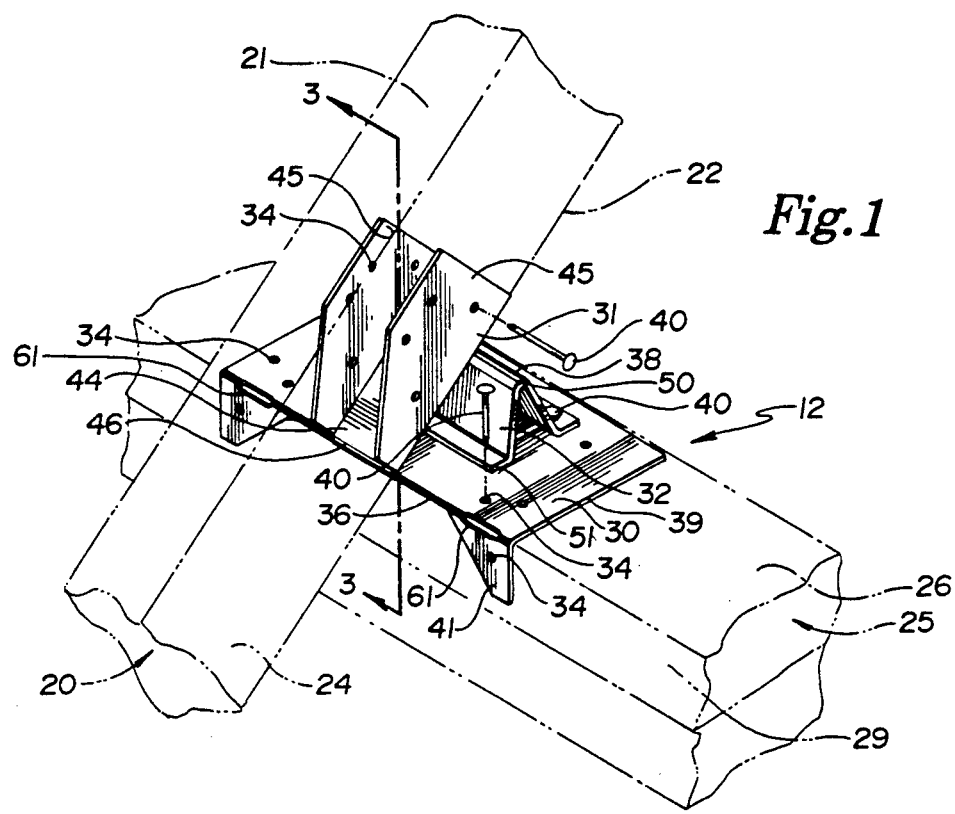
Fig.1
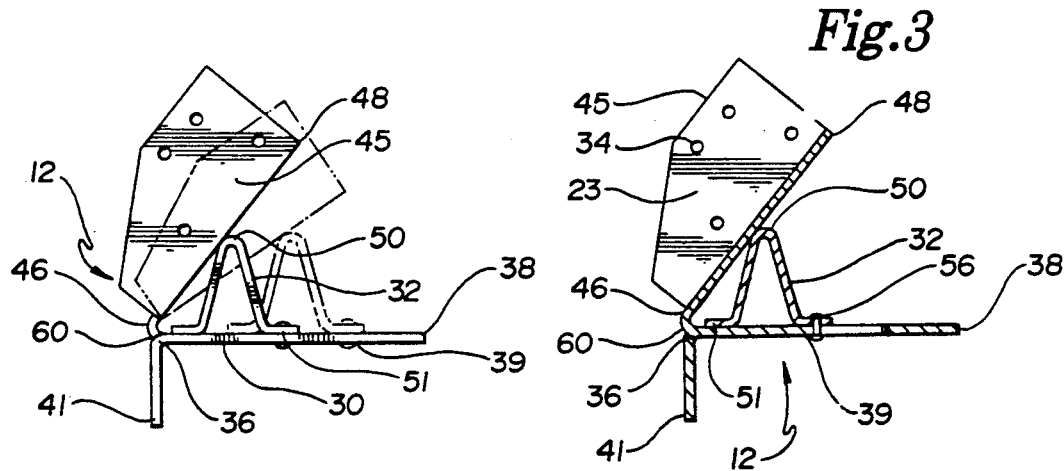
Fig.3
Fig.2

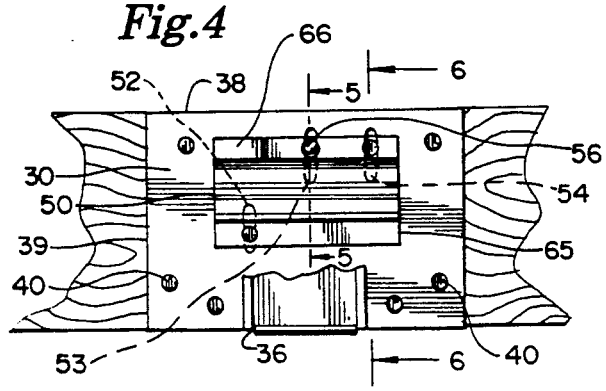
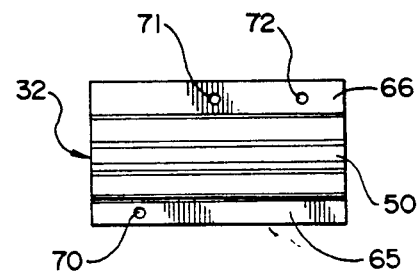
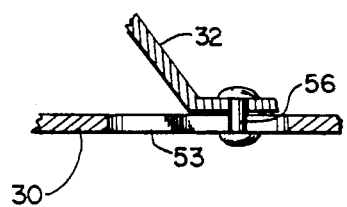
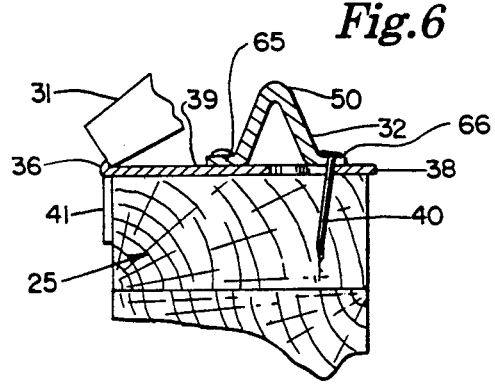
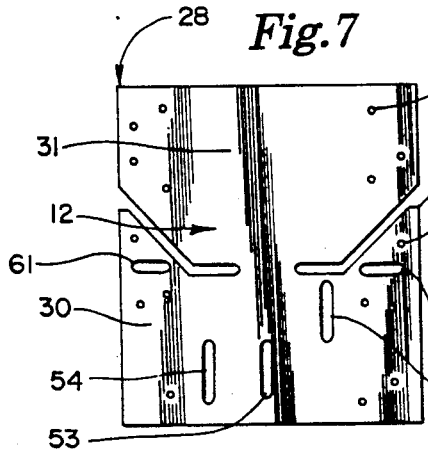
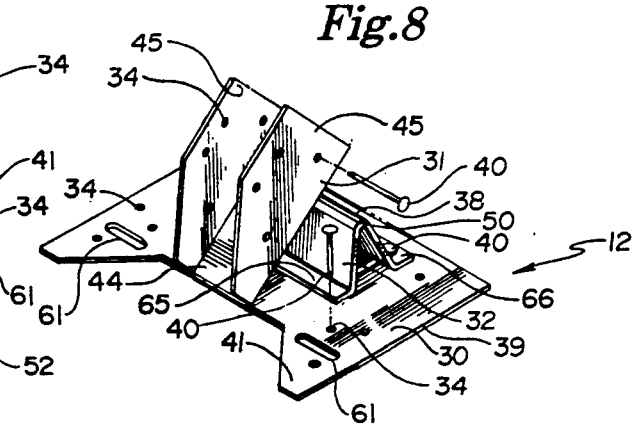

VARIABLE PITCH CONNECTOR

BACKGROUND OF THE INVENTION

1. Field of the Invention

The present invention relates generally to the field of roof hangers and the like, and more particularly, to a variable pitch connector that is capable of supporting an inclined roof rafter. The invention also relates to a variable pitch connector which may be retrofitted to existing roof assemblies and a method of installing such connector.

2. Description of the Prior Art

Prior to the advent of roof connectors, the conventional method of joining rafters to a sill plate involved toe nailing the two members together. There are many disadvantages to toe nailing. The method results in a decrease of strength to the members and often results in the members splitting. The technique of toe nailing is also imprecise and depends greatly on the skill of the carpenter. In response to these problems, a variety of connectors and roof rafters supports have been developed to help join a rafter to a sill plate in a roof assembly.

DeHuff, U.S. Pat. No. 2,354,801 discloses a rafter seat. This device is used to mount rafters to bearing members. The seat is manufactured as one piece and provides minimal support. The device is not adjustable and the seat cannot be retrofitted to an existing structure.

Nelson, U.S. Pat. No. 3,184,800 discloses a rafter support. The support is manufactured as a single. The support has no seat support and it is not adjustable.

Prins, U.S. Pat. No. 4,015,399 discloses a bracket for use in prefabricated buildings and is not practical for any other use.

Simpson, U.S. Pat. No. 4,410,294 discloses a variable pitch connector. The various pitch settings are achieved through bending an upright member at a desired angle. The device is manufactured as a single piece and cannot be retrofitted to an existing roof assembly.

In the competitive and cost sensitive world of construction, builders and carpenters are cost and time pressured. To meet the demands of the industry, there is a need for flexibility in a connector. Such a connector should be adjustable. The connector must support heavy loads, yet still be lightweight and easy to install. A further desireable feature is the ability to retrofit the connector to existing structures. The device must also be cost effective.

Accordingly, there is need for a cost effective connector that provides these features.

SUMMARY OF THE INVENTION

The variable pitch connector of the present invention provides the strength and adjustability desired in a roof rafter connector. In contrast to the prior art, the components of the present invention may be manufactured out of differing thicknesses of steel. This construction allows the use of lighter gauge steel in the base components while providing heavier gauge steel in the support components, where strength is needed most.

The connector of the present invention is adjustable. One connector can achieve a variety of desired pitches. The adjustability cuts costs because a builder need not stockpile vast quantities of different fixed pitch connectors. Instead, the builder need only purchase one type of connector. Adjustability is achieved by provision of an adjustable, separate support member which is preferably constructed from a material of different thickness, but does not need to be.

Unlike prior art variable pitch connectors, the connector of the present invention can be retrofitted to an existing structure. As such, the connector is useful for remodeling or strengthening existing roofs without the need for extensive repair or refurbishing.

Accordingly, it is an object of the present invention to provide a variable pitch connector wherein the components may be manufactured from materials of different thicknesses.

Another object of the invention is to provide a variable pitch connector that provides improved strength, but which is lightweight.

A further object of this invention is to provide a variable pitch connector that may be retrofitted to existing structures.

A further object of the present invention is to provide an improved method of retrofitting a connector to a roof rafter.

These and other objects of the present invention will become apparent with reference to the drawings, the description of the preferred embodiment and the appended claims.

BRIEF DESCRIPTION OF THE DRAWINGS

FIG. 1 is a perspective view of the variable pitch connector of the present invention showing the sill plate and an inclined roof rafter in phantom.

FIG. 2 is an elevational side view of the variable pitch connector of the present invention with a second position of the cradle member and support illustrated in phantom.

FIG. 3 is a view, partially in section, of the variable pitch connector as viewed along the section line 3—3 of FIG. 1 without the sill plate and roof rafter.

FIG. 4 is an elevational plan view of the connector attached to the sill plate, with portions broken away.

FIG. 5 is an enlarged fragmentary view, partially in section, of the connection means for connecting the adjustable support to the base as viewed along the section line 5—5 of FIG. 4.

FIG. 6 is a view, partially in section, as viewed along the section line 6—6 of FIG. 4, showing the connection means between the support and the base.

FIG. 7 is an elevational plan view of a blank of the variable pitch connector.

FIG. 8 is a perspective view of a retrofittable form of the variable pitch connector of the present invention.

FIG. 9 is an elevational plan view of the support member for use with the connector of the present invention.

DESCRIPTION OF THE PREFERRED EMBODIMENT

The connector of the present invention is a variable pitch connector illustrated best in FIG. 1 by the reference character 12. The connector 12 is used to connect an inclined member, such as a roof rafter 20, to a load bearing member, such as at op or sill plate 25. The roof rafter 20 of the preferred embodiment is generally rectangular in cross sectional configuration, with a top surface 21, a bottom surface 22, and a pair of side surfaces 24. It is contemplated, however, that the rafter 20 can also be a wood "I" beam. The top or sill plate 25 includes a top surface 26, and an outer side surface 29.

The connector 12 has a base 30 for connection to the top plate 25, a cradle member 31 for receiving and supporting the rafter 20, and a support member 32 for supporting the cradle 31. Tab means 41 are also provided for positioning the connector relative to the plate 25. As shown in FIG. 7, the cradle 31, the base 30, and the tab means 41 are manufactured in one piece from a single blank 28. The support 32 is manufactured as a separate piece and preferably from a heavier gauge or thicker material.

With general reference to FIGS. 1-9, the base 30 and tab means 41 are provided with a plurality of nail receiving openings 34. The openings 34 receive attaching fasteners or nails 40 for connection to the plate 25. The cradle 31 is also provided with a plurality of openings 34. These openings 34 similarly receive attaching fasteners or nails 40 for connection to the rafter 20. It is contemplated that various other means known in the art could also be used to connect the base to the plate 25 and the cradle 31 to the rafter 20.

The base 30 has a generally rectangular configuration with front and back edges 36 and 38, although a variety of other shapes may also be used. The cradle 31 is bendably connected to the base 30 along the front edge 36. As will be described below, the base 30 includes a plurality of elongated slots 52, 53 and 54 to connect the adjustable support 32 to the base 30 and to connect the base 30 to the plate 25. Each of the slots 52, 53 and 54 is elongated in a direction perpendicular to the front edge 36.

The cradle member 31 is integrally and bendably attached to the base 30 along a portion of the front edge 36. The cradle includes a bottom 44 and a pair of sides 45 extending upwardly at right angles from the bottom 44. The bottom 44 has a front connection edge 46 and back free edge 48. The front connection edge 46 is integrally and bendably attached to the front edge 36 to the base 30 to facilitate selective positioning of the cradle 31 relative to the base 30. The back edge 48 of the cradle 31 is free and is unsupported except by the support 32. The cradle 31 is configured such that the rafter 20 fits between the sides and is supported by the bottom 44 of the cradle 31 as shown.

The support 32 is slidably attached to the base 30 and has a generally inverted "v" shaped configuration extending from a pair of spaced edges 65, 66 that engage the base 30. The generally "v" shaped support 32 includes a support apex 50 for engagement with the bottom 44 of the cradle 31.

The support 32 may be constructed from a variety of materials, but is preferably constructed of steel or other load bearing metal. Most preferably, the support 32 is constructed of at least 12 gauge steel but other weights may be used as well. Because the support 32 is manufactured as a separate piece, the other component comprising the base 30 and cradle 31 may be manufactured using a lighter weight material. In the preferred embodiment, this lighter weight material is a 14, 16 or 18 gauge steel.

The support 32 is adjustable in a direction generally perpendicular to the front edge 36. To facilitate the adjustability of the support 32, edges 65, 66 are provided with holes or openings 70, 71 and 72 (FIG. 9) which correspond with the position of the slots 52, 53 and 54, respectively, of the base 30.

As illustrated best in FIGS. 4 and 5, a rivet 56 or other connecting means extends through the hole 71 and the sot 53 to slidably connect the support 32 relative to the base 30. The holes 70 and 72 are aligned with the slots 52 and 54, respectively, to allow a nail to be driven through the hole and its corresponding slot and into the plate 25. Such nails function to fix the position of the support relative to the plate 25. The elongated slots 52 and 54 enable the support 32 to be fixed to the plate 25 in various positions relative to the base 30. In the preferred embodiment, the slots 52 and 54 are parallel to one another and the holes 70 and 72 are in the edges 65 and 66, respectively.

In the preferred embodiment, the connection member 56 is a tubular rivet with one head engaging the top surface of the edge 66 and the other engaging the bottom surface of the base 30. The rivet 56 enables limited sliding movement of the support 32 relative to the base 30 to facilitate angle adjustment for the cradle 31.

In the embodiment illustrated in FIG. 1, the base 30 is provided with a pair of tabs 41 which extend downwardly from the base 30 at right angles. The tabs 41 are spaced from one another and include holes 34 to connect the tabs 41 to the side surface 29 of the plate 25. The tabs 41 are located on each side of the cradle 31. The space between the tabs 41 is at least as wide as the width of the cradle 31. Bending slots 61 are provided at the junction between the tab 41 and the front edge 36 of the base 30 to facilitate proper bending of the tabs 41.

Some embodiments of the connector may be retrofitted to existing structures. FIG. 8 illustrates such an embodiment. The embodiment of FIG. 8 is identical to that of FIG. 1 except that the tabs 41 of FIG. 8 are in the same plane as the base 30. In retrofitting the connector of FIG. 8, the base is aligned on top of the plate 25. The connector is pushed towards the rafter 20 so that the cradle 32 engages such rafter. The desired pitch is selected by adjusting the support 32 until the rafter 20 rests in the cradle 31. Sufficient fasteners 40 are then driven through the openings 34 in the base 30 into the plate 25. Nails are then driven through the openings 70 and 72 and their corresponding slots 52 and 54 to connect the support 32 to the plate 25. The tab members 41 are then bent to contact the side surface 29 of the bearing member 25. Nails are then driven through the openings 34 of the tabs 41 to the side surface 29 of the plate 25. Lastly, nails 40 are driven through the openings 34 in the cradle 31 to connect the cradle to the rafter 20.

Having described the preferred embodiment, the use of the connector of the present invention can best be understood as follows. First, the connector is placed on the plate 25 in the desired position. The base 30 is then connected to the plate by driving nails 40 through the openings 34 in the base and into the plate. Nails are also driven into the holes 34 in the tabs 41. The rafter 20 is then placed in the cradle 31 and is then bent to the desired angle. Nails 40 are then driven through the holes 34 of the cradle 31. The support 32 is then slidably adjusted to a position which supports the cradle 31 at such angle. Nails 40 are then driven through the holes 70 and 72, and their corresponding slots 52 and 54, and into the top surface of the plate 25.

Although the description of the preferred embodiment has been quite specific, it is contemplated that various modifications may be made without deviating from the spirit of the present invention. Accordingly, it is intended that the scope of the present invention be dictated by the appended claims rather than by the description of the preferred embodiment.

I claim:

1. A connector for connecting a bearing member, having top, bottom, and side faces, with an inclined member having top, bottom and side faces, said connector comprising:
- a base having a first edge and means for connecting said base to said bearing member;
- a cradle member having a connection end, a free end, a bottom and a pair of sides extending upwardly at right angles from said bottom and configured to receive said inclined member, said cradle member being integrally connected at said connection end to said base along said first edge and including means for connecting said cradle to said inclined member; and
- a separate support member, connected to said base for supporting said cradle member.

2. The connector of claim 1 wherein said integral connection between said cradle member and said base facilitates limited bending movement along said first edge to a selected inclined position and wherein said support member is adjustably connected to said base for supporting said cradle member at said selected inclined position.

3. The connector of claim 2 including adjustable attachment means for adjustably attaching said support member to said base.

4. The connector of claim 3 wherein said adjustable attachment means includes first and second openings in said support member and said base, respectively, a connection member extending through said first and second openings and at least one of said first and second openings being elongated.

5. The connection of claim 4 wherein said elongated opening is elongated in a direction perpendicular to said first edge.

6. The connector of claim 3 wherein said adjustable attachment means includes a nail receiving opening in said support member and a corresponding aligned opening in said base.

7. The connector of claim 4 wherein said adjustable attachment means includes a nail receiving opening in said support member and a corresponding aligned opening in said base.

8. The connector of claim 7 wherein said aligned opening is elongated.

9. The connector of claim 8 wherein said adjustable attachment includes a pair of nail receiving openings and a pair of corresponding elongated aligned openings in said base.

10. The connector of claim 9 wherein said support member includes a pair of spaced base engaging edges and a support portion extending upwardly from said base engaging edges and defining a support apex.

11. The connector of claim 10 wherein one of said nail receiving openings is in each of said base engaging edges.

12. The connector of claim 11 wherein said support member, said base and said cradle member are formed of metal and said support member is formed of a different weight metal than said base and said cradle member.

13. The connector of claim 1 wherein said support member, said base and said cradle member are formed of metal and said support member is formed of a different weight metal than said base and said cradle member.

14. The connector of claim 1 wherein said means for connecting said base to said bearing member and for connecting said cradle to said inclined member includes a plurality of nail receiving openings.

15. The connector of claim 1 including tab means extending from said base at right angles along said first edge and having nail receiving openings.

16. The connector of claim 15 wherein said tabs are spaced and are positioned on opposite sides of said cradle.

17. A connector for retrofitting to an existing bearing member, having top, bottom, and side faces, and inclined member having top, bottom and side faces, assembly, said connector comprising:
- a base having a first edge and means for connection to said bearing member;
- a cradle member having a connection end, a free end, a bottom and a pair of sides extending upwardly at right angles from said bottom and configured to receive said inclined member, said cradle member being integrally connected at said connection end to said base along said first edge; and
- a pair of bendable tabs, in substantially the same plane as the base, said tabs spaced from one another to define an open area between said tabs and position on opposite sides of said cradle, said tabs being selectively bendable along said first edge of said base, forward of said edge.

18. The connector of claim 17 including a separate support member connected to said base for supporting said cradle member.

19. The connector of claim 18 wherein the position of said separate support relative to said base is adjustable.

20. A method of retrofitting a connector to an existing bearing member and inclined member assembly in which said connector includes a base, a pair of bendable tab members, a cradle member integrally formed with the base, a means for supporting the cradle member and a means for connecting the base, tabs, and support to the bearing member and the cradle to the inclined member, said method comprising:
- a. positioning the base on the bearing member and aligning the cradle with the inclined member;
- b. sliding the connector until the inclined member contacts the cradle and the tabs extend over the bearing member;
- c. bending the tabs down to engage a portion of the bearing member;
- d. connecting the base and tabs, said bearing member and the cradle to the inclined member.

21. The method of claim 20 including providing and adjustable support for the cradle and fixing said support to the bearing member so that the cradle is inclined at the pitch of the inclined member.

* * * * *